United States Patent Office 3,241,909
Patented Mar. 22, 1966

---

3,241,909
RECOVERY OF URANIUM VALUES BY SOLVENT EXTRACTION
Angus V. Henrickson, Wheat Ridge, Colo., assignor to Kerr-McGee Oil Industries, Inc., a corporation of Delaware
No Drawing. Filed Dec. 13, 1962, Ser. No. 244,292
20 Claims. (Cl. 23—14.5)

This invention relates to the recovery of uranium values from source materials and, in one of its more specific aspects, to the recovery of uranium values from aqueous leach liquors by extraction with a water-insoluble organic amine. The invention further relates to a novel method of stripping uranium values from a uranium-loaded organic amine extractant in the presence of magnesium oxide and/or magnesium hydroxide.

It is known to treat uranium ores by leaching with aqueous sulfuric acid, usually in the presence of an oxidizing agent such as sodium chlorate or manganese dioxide, so as to solubilize to a large extent the uranium content of the ore. In this solubilization scheme, the uranium appears in the leach liquor as uranyl ion ($UO_2^{++}$). Other metals such as iron, aluminum, vanadium, etc. also are solubilized to an extent determined by the conditions of treatment.

The recovery of a relatively pure uranium concentrate from sulfuric acid leach liquor may be achieved in a number of ways and an especially useful and economic process involves solvent extraction with water immiscible amine solvents. Such extractants may comprise a minor proportion, usually below 10% by weight, of an organic amine which is substantially insoluble in water and dilute aqueous acidic solutions but soluble in an inert, water immiscible, organic, relatively non-polar organic solvent. Under well known conditions to be more fully described hereinafter, the uranium content of the aqueous leach liquor may be transposed essentially quantitatively and with high selectivity from the aqueous leach liquor into the organic amine extractant phase. Physical separation of the two phases affords an uranium-loaded organic solution and after a sufficient number of contacts with successive quantities of solvent, a uranium-barren raffinate. The chemistry of the extraction process has not been entirely clarified. However, a simplified illustration of the various chemical reactions operative in the above-described uranium recovery scheme is usually set forth as follows:

(1) The uranium is most likely extracted from the aqueous sulfuric acid leach liquor by an ion exchange mechanism, the species of the uranium ion active in the ion exchange mechanism being uranyl sulfate anionic complex such as, for example, $UO_2(SO_4)_2^{--}$.

(2) In order for the reaction to take place to an economic degree of completion, excess sulfate ion must be present so that the above-mentioned complex may be formed, as governed by the equation $$UO_2SO_4 + SO_4^{--} \rightleftharpoons UO_2(SO_4)_2^{--}$$

In the absence of a substantial excess of sulfate ion, extraction by the organic amine solvent is very poor.

(3) The reaction between the uranium anionic complex and the organic amine extractant present in the organic solvent phase either as free amine or the amine sulfate may be expressed in a simplified manner as given below in Equation 1:

(1)

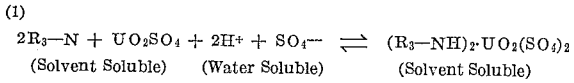

In Equation 1 above and Equation 2 to be given hereinafter, the condensed formula for the amine may be given as $R_3N$. However, it is not necessary that the amine be a tri-alkyl substituted amine. Instead, it may be a primary or secondary amine in many instances provided the substituent carbon chains are long enough to confer water-insoluble and organic solvent soluble properties. Thus, R in the formula $R_3N$ may be either an alkyl group or hydrogen, provided one R is an alkyl group.

(4) The absorbed uranium values are recovered from the organic phase by stripping with a suitable aqueous stripping solution. In accordance with the prior art practice, usually neutral or acidic nitrate or chloride solutions are used. The nitrate or chloride may be present as the sodium salt and in such instances the reaction governing stripping of uranium values from the uranium-loaded organic phase is illustrated below by Equation 2:

(2)

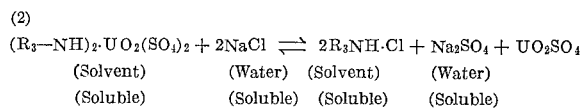

The organic amine solvent extractant which has been stripped of uranium in the above-mentioned conventional operation issues from the stripping section in the form of a solvent soluble alkyl ammonium chloride salt in a chloride system or the corresponding nitrate in a nitrate system. When recycled to the extraction circuit, the organic amine solvent releases an equivalent of chloride or nitrate to the leach liquor for every equivalent of uranyl sulfate complex which it extracts. As a result, if the barren leach liquor is recycled to the leaching step, the chloride or nitrate concentration of the leach liquor will rise and continue to rise until it reaches intolerable levels due to interference with the uranium solvent extraction process. The build-up of chloride or nitrate stripping ion in recycling leach liquor may be reduced by converting the organic amine nitrate or chloride to the free base. This may be accomplished by contacting the same with ammonia, sodium carbonate or sodium hydroxide before the stripped organic amine solvent is returned to the extraction circuit. However, this is an expensive treatment as an equivalent of base is required for each equivalent of chloride or nitrate to be removed.

In view of the foregoing, the art has long recognized that it would be desirable to provide an entirely satisfactory commercial method of stripping uranium-loaded organic amine solvent extractants which results in the stripped amine being in the free-base form rather than in the form of the chloride or nitrate salts. The prior art methods available heretofore were not satisfactory for a number of reasons due to precipitation of uranium values from the aqueous phase during the stripping operation, emulsion formation and phase separation difficulties, or other problems.

It is an object of the present invention to provide a novel method of recovering uranium values by solvent extraction with an organic amine solvent extractant.

It is a further object to provide a novel method of stripping uranium-loaded organic amine extractants.

It is still a further object to provide a novel method of recovering uranium values by solvent extraction with an organic amine solvent extractant, in which the uranium-loaded amine extractant is stripped of uranium to produce an aqueous solution of uranium values and regenerated amine extractant in the free base form.

Still other objects and advantages of the present invention will be apparent to those skilled in the art upon reference to the following detailed description and the examples.

In accordance with one important aspect of the present invention, it has been discovered that absorbed uranium values may be stripped from an organic diluent solution of a substantially water-insoluble uranium-loaded amine solvent extractant by contacting with an aqueous medium in the presence of magnesium oxide and/or magnesium hydroxide to produce an aqueous solution containing dissolved uranium values. The aqueous medium after contacting with the organic diluent solution of uranium-loaded extractant has a pH value less than that at which a substantial amount of magnesium diuranate is precipitated. Thereafter, the resulting aqueous medium containing the dissolved uranium values may be separated from the stripped organic diluent solution of uranium extractant without phase separation difficulties and a uranium concentrate recovered by conventional procedures.

It is preferred that the aqueous medium after contacting with the organic diluent solution of uranium-loaded extractant have a pH value less than 4.5. Preferably, the pH value should be about 3.2 to 4.2 in most instances. The final pH value of the stripping solution may be maintained within desired limits by controlling the amount of magnesium oxide and/or hydroxide which is present initially. Preferably, about 1 chemical equivalent of magnesium oxide and/or magnesium hydroxide is present initially for each chemical equivalent of the organic amine. However, an excess may be present in some instances up to that quantity providing a pH within the defined limits.

Preferably, the uranium-loaded amine extractant is contacted with a slurry of water and finely divided magnesium oxide and/or hydroxide. The magnesium oxide and/or hydroxide may have a particle size of about —100 to —200 mesh or finer, and in some instances somewhat larger particles may be used. It is also possible to agitate a mixture of the uranium-loaded amine extractant, water and large pellets or particles of the magnesium oxide and/or hydroxide of a size which will allow ready and easy separation upon completing the stripping step. In such instances, the magnesium oxide and/or hydroxide and aqueous phase may be contacted with the loaded amine extractant for a period of time sufficient to result in the desired degree of stripping, which occurs within the pH ranges discussed above. In instances where an excess of magnesium oxide and/or hydroxide is present, such as when large pellets or particles are used, it is understood that the aqueous phase is in contact therewith for a period of time sufficient to result in a final pH within the above limits, and not for a period of time sufficient to result in a final pH after stripping sufficiently high to precipitate the uranium values as magnesium diuranate.

The temperature at which the aqueous medium is contacted with the uranium-loaded amine extractant is not critical. However, faster stripping may occur at elevated temperatures and in some instances temperatures between about 50° C. and the boiling point may be preferred. Also, it is usually preferred that the mixture be agitated during the stripping step by any convenient prior art device or method to thereby assure that the aqueous and organic phases are in intimate contact.

The nature of organic amine solvent extractants for use in extracting uranium are well known to the art. A given amine should possess certain qualities such as solubility in kerosene, naphtha, benzene, chlorinated solvents or other suitable organic diluent. It should not be appreciably soluble in water or in dilute aqueous acid, as otherwise a substantial amount of the relatively expensive amine would be lost in extraction and stripping operations. The amine should have a relatively high capacity per unit weight for the uranyl sulfate complex to be absorbed and it should be stable under the conditions encountered during the extraction and stripping operations. In addition, the amine should have at most a minimal surface activity so that it does not promote emulsification of aqueous and organic phases during extraction or stripping.

In general, the foregoing requirements are met in the instance of relatively high molecular weight alkyl substituted amines such as tri-n-alkyl amines where the alkyl groups have at least 6 carbon atoms per alkyl group, dialkyl amines where the substituent alkyl groups have from about 8–10 up to about 20–30 carbon atoms per chain, and mono-alkyl amines having molecular weights in the neighborhood of about 250–300, e.g., about 18–30 carbon atoms in the alkyl substituent. The alkyl substituents may be normal or extensively branched, the latter generally conferring better solvent solubility to the amine and its complexes in the organic diluent or carrier. It is usually preferred to employ secondary and tertiary amines as solvents rather than mono-alkyl primary amines.

The solution of extractant generally comprises a minor proportion of the organic amine extractant such as 5–10 volume percent, approximately an equal amount or more of relatively inert solubilizing additives such as isodecanol, dodecanol, tributyl phosphate, etc., and the remainder a diluent carrier such as a moderate to high flash point kerosene.

In some instances, it may be possible to employ quaternary amine solvent extractants for uranium and the selection of any specific amine is within the skill of the art. Also, the conditions under which uranium is extracted by organic amine solvents are well known. The described methods in the literature for intimately contacting uranium-bearing sulfuric acid leach liquor with organic amine extractants, such as in a prior art mixer-settler, and separating the phases to obtain uranium-loaded organic extractant are satisfactory in practicing the present invention. Stripping the uranium-loaded extractant with the aqueous medium in the presence of magnesium oxide and/or hydroxide also may be carried out in conventional mixer-settler systems and preferably in a number of countercurrent stages. Stripping also may be carried out in countercurrent fashion in packed towers, columns, etc., whether pulsed or not, in batch mixing, settling and decanting operations. Such operations are likewise well known to the art.

The foregoing detailed description and the following specific examples are for purposes of illustration only, and are not intended as being limiting to the spirit or scope of the appended claims.

EXAMPLE I

This example describes the preparation of uranium-loaded amine solvent extractant for use in stripping experiments.

Employing a high flash point kerosene (Kerr-McGee Oil Industries "Napoleum 470") as vehicle, 2½% by weight of General Mills "trifatty amine" (a mixed tri-alkyl amine wherein the alkyl groups contain an average of 8–10 carbon atoms) and 3–4 volume percent of isodecanol as a stabilizing agent, are dissolved to produce a solution of extractant. The solution of extractant is then contacted in a mixer-settler with successive portions of an aqueous uranyl sulfate solution at a pH of about 1.75 until the amine is loaded to a desired level. The uranyl sulfate solution is prepared by leaching a uranium ore with aqueous sulfuric acid in the presence of ferric ion as an oxidant. The resulting kerosene solution of uranium-loaded extractant is then separated from the aqueous phase and stripped to recover the absorbed uranium values under conditions defined hereinafter.

EXAMPLE II

A uranium-loaded trifatty amine solvent extractant containing 2.4 grams of uranium values per liter calculated as $U_2O_8$ was used in this example.

750 ml. of the uranium-loaded extractant was mixed with 75 ml. of water. Magnesium hydroxide in finely divided form was added in increments with vigorous agitation until the terminal pH value of the aqueous phase was 4.1. No magnesium diuranate was precipitated at this pH value. The aqueous and organic phases separated rapidly and with no tendency toward emulsion formation.

The organic and aqueous phases were separated and each phase was analyzed for uranium. The stripped organic phase contained only 0.03 g./l. of $U_3O_8$, as compared with 2.4 g./l. initially. The aqueous phase contained 31.8 g./l. of $U_3O_8$, and was free of precipitated magnesium diuranate.

EXAMPLE III

The uranium-loaded trifatty amine solvent extractant stripped in this example was the same as that employed in Example II.

750 ml. of uranium-loaded extractant was mixed with 75 ml. of water as in Example II and powdered magnesium oxide was added in increments to a final pH of 3.4. The aqueous and organic phases were agitated vigorously during the addition of magnesium oxide. No magnesium diluranate was precipitated.

The aqueous and organic phases were separated and each phase analyzed for uranium. The uranium-loaded solvent which initially contained 2.4 g./l. of uranium values calculated as $U_3O_8$, now contained 0.98 g./l. of $U_3O_8$. The aqueous strip solution at the final pH of 3.4 contained 17.0 g./l. of uranium values calculated as $U_3O_8$.

EXAMPLE IV

A uranium-loaded trifatty amine solvent extractant containing 2.0 g./l. of uranium values calculated as $U_3O_8$ was employed in this example.

750 ml. of the extractant was mixed with 75 ml. of water and agitated vigorously. Finely divided magnesium oxide was added in increments. Samples of the organic phase were removed periodically and analyzed for uranium content at pH 3.1, 3.5, 3.8, 4.2 and 4.5. The data obtained are shown below:

| pH of aqueous phase | $U_3O_8$ in organic phase, g./l. | Percent of uranium values stripped |
| --- | --- | --- |
| 2.2 | 2.0 | No magnesium oxide added. |
| 3.1 | 0.10 | 80. |
| 3.5 | Less than 0.01 | Greater than 99.5. |
| 3.8 | do | Do. |
| 4.2 | do | Do. |
| 4.5 | Precipitate started to form. | Do. |

What is claimed is:

1. A method of stripping absorbed uranium values from a solution of substantially water-insoluble uranium-loaded organic amine solvent extractant for uranium, the extractant being dissolved in a substantially water-insoluble organic diluent therefor, comprising
    intimately contacting the organic diluent solution of uranium-loaded extractant with an aqueous medium in the presence of at least one magnesium-containing substance selected from the group consisting of magnesium oxide, magnesium hydroxide and mixtures thereof in an amount effective to strip uranium values therefrom and produce an aqueous solution containing dissolved uranium values,
    the pH value of the aqueous medium after contacting with the organic diluent solution of uranium-loaded extractant being less than that at which a substantial amount of magnesium diuranate is precipitated, the pH value being greater than 2.2 and less than 4.5,
    and the separating the aqueous medium containing the dissolved uranium values from the organic diluent solution of uranium extractant.

2. The method of claim 1 wherein the aqueous medium after contacting with the organic diluent solution of uranium-loaded extractant has a pH value between about 3.1 and less than 4.5.

3. The method of claim 1 wherein the aqueous medium after contacting with the organic diluent solution of uranium-loaded extractant has a pH value of about 3.2 to 4.2.

4. The method of claim 1 wherein the aqueous medium contacted with the organic diluent solution of uranium-loaded extractant contains about one chemical equivalent of the magnesium-containing substance for each chemical equivalent of the organic amine.

5. A method of stripping absorbed uranium values from a solution of substantially water-insoluble uranium-loaded organic amine solvent extractant for uranium, the extractant being dissolved in a substantially water-insoluble organic diluent therefor, comprising
    intimately contacting the organic dilunt solution of uranium-loaded extractant with an aqueous suspension consisting essentially of water and at least one finely divided magnesium-containing substance selected from the group consisting of magnesium oxide, magnesium hydroxide and mixtures thereof in an amount effective to strip uranium values therefrom and produce an aqueous solution containing dissolved uranium values,
    the pH value of the aqueous medium after contacting with the organic diluent solution of uranium-loaded extractant being less than that at which a substantial amount of magnesium diuranate is precipitated, the pH value being greater than 2.2 and less than 4.5,
    and then separating the aqueous medium containing the dissolved uranium values from the organic diluent solution of uranium extractant.

6. The method of claim 5 wherein the aqueous medium after contacting with the organic diluent solution of uranium-loaded extractant has a pH value between about 3.1 and less than 4.5

7. The method of claim 5 wherein the aqueous medium after contacting with the organic diluent solution of uranium-loaded extractant has a pH value of about 3.2 to 4.2.

8. The method of claim 5 wherein the aqueous suspension contacted with the organic diluent solution of uranium-loaded extractant contains about one chemical equivalent of the magnesium-containing substance for each chemical equivalent of the organic amine.

9. A method of preparing a uranium concentrate comprising
    leaching uranium ore with aqueous sulfuric acid to produce an aqueous leach liquor containing dissolved uranium values,
    intimately contacting the aqueous leach liquor with a solution of substantially water-insoluble weak base organic amine solvent extractant for uranium to absorb uranium values therefrom and produce a uranium loaded extractant,
    the extractant being dissolved in a substantially water-insoluble organic diluent therefor,
    intimately contacting the organic diluent solution of uranium-loaded extractant with an aqueous medium in the presence of at least one magnesium-containing substance selected from the group consisting of magnesium oxide, magnesium hydroxide and mixtures thereof in an amount effective to strip uranium values therefrom and produce an aqueous solution containing dissolved uranium values,
    the pH value of the aqueous medium after contacting with the organic diluent solution of uranium-loaded extractant being less than that at which a substantial amount of magnesium diuranate is precipitated, the pH value being greater than 2.2 and less than 4.5,
    separating the aqueous medium containing the dissolved uranium values from the organic diluent solution of uranium extractant,
    precipitating a uranium concentrate from the separated aqueous medium by addition of a basic substance and
    separating the precipitated uranium concentrate from the aqueous medium.

10. The method of claim 9 wherein the aqueous medium after contacting with the organic diluent solution of uranium-loaded extractant has a pH value of about 3.2 to 4.2.

11. The method of claim 9 wherein the aqueous medium contacted with the organic diluent solution of uranium-loaded extractant contains about one chemical equivalent of the magnesium-containing substance for each chemical equivalent to the organic amine.

12. A method of preparing a uranium concentrate comprising leaching uranium ore with aqueous sulfuric acid to produce an aqueous leach liquor containing dissolved uranium values, intimately contacting the aqueous leach liquor with a solution of substantially water-insoluble weak base organic amine solvent extractant for uranium to absorb uranium values therefrom and produce a uranium-loaded extractant, the extractant being dissolved in a substantially water-insoluble organic diluent therefor, intimately contacting the organic diluent solution of uranium-loaded extractant with an aqueous suspension consisting essentially of water and at least one finely divided magnesium-containing substance selected from the group consisting of magnesium oxide, magnesium hydroxide and mixtures thereof in an amount effective to strip uranium values therefrom and produce an aqueous solution containing dissolved uranium values, the pH value of the aqueous after contacting with the organic diluent solution of uranium-loaded extractant being less than that at which a substantial amount of magnesium diuranate is precipitated, the pH value being greater than 2.2 and less than 4.5, separating the aqueous medium containing the dissolved uranium values from the organic diluent solution of uranium extractant, precipitating a uranium concentrate from the separated aqueous medium by addition of a basic substance and separating the precipitated uranium concentrate from the aqueous medium.

13. The method of claim 12 wherein the aqueous medium after contacting with the organic diluent solution of uranium-loaded extractant has a pH value of about 3.2 to 4.2.

14. The method of claim 12 wherein the aqueous medium contacted with the organic diluent solution of uranium-loaded extractant contains about one chemical equivalent of the magnesium-containing substance for each chemical equivalent of the organic amine.

15. The method of claim 1 wherein the solvent extractant for uranium comprises an alkyl substituted amine selected from the group consisting of tri-n-alkyl amines, dialkyl amines and mono-n-alkyl amines, the alkyl groups containing not more than 30 carbon atoms per alkyl group and at least 6 carbon atoms when the amine is a tri-n-alkyl amine, at least 8 carbon atoms when the amine is a dialkyl amine, and at least 18 carbon atoms when the amine is a mono-n-alkyl amine.

16. The method of claim 15 wherein the amine solvent extractant is a tri-n-alkyl amine.

17. The method of claim 1 wherein the amine solvent for uranium is a tri-n-alkyl amine and the alkyl groups contain about 8–10 carbon atoms.

18. The method of claim 12 wherein the solvent extractant for uranium comprises an alkyl substituted amine selected from the group consisting of tri-n-alkyl amines, dialkyl amines and mono-n-alkyl amines, the alkyl groups containing not more than 30 carbon atoms per alkyl group and at least 6 carbon atoms when the amine is a tri-n-alkyl amine, at least 8 carbon atoms when the amine is is a dialkyl amine and at least 18 carbon atoms when the amine is a mono-n-alkyl amine.

19. The method of claim 18 wherein the amine solvent extractant is a tri-n-alkyl amine.

20. The method of claim 12 wherein the amine solvent extractant for uranium is a tri-n-alkyl amine and the alkyl groups contain about 8–10 carbon atoms.

References Cited by the Examiner

UNITED STATES PATENTS 2,877,250   3/1958   Brown et al. _____ 23—14.5

OTHER REFERENCES

A.E.C. Document RMO—2533, pp. 7–17, December 19, 1956.

A.E.C. Document ORNL–2099, pp. 10, 53–54, November 29, 1956.

REUBEN EPSTEIN, *Primary Examiner.*

CARL D. QUARFORTH, *Examiner.*